United States Patent
Zhao et al.

(10) Patent No.: US 10,002,720 B2
(45) Date of Patent: Jun. 19, 2018

(54) PREPARATION OF METAL OXIDE-GRAPHENE COMPOSITE FILMS

(71) Applicant: East China University of Science and Technology, Shaghai (CN)

(72) Inventors: Chongjun Zhao, Shanghai (CN); Xiangmao Dong, Shanghai (CN); Shudi Min, Shanghai (CN); Zhuomin Zhang, Shanghai (CN); Kun Wang, Shanghai (CN); Jianbo Dong, Shanghai (CN); Xiuzhen Qian, Shanghai (CN); Xin Chen, Shanghai (CN)

(73) Assignee: EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 0 days. days.

(21) Appl. No.: 14/773,216

(22) PCT Filed: Mar. 5, 2013

(86) PCT No.: PCT/CN2013/072182
§ 371 (c)(1),
(2) Date: Sep. 4, 2015

(87) PCT Pub. No.: WO2014/134782
PCT Pub. Date: Sep. 12, 2014

(65) Prior Publication Data
US 2016/0020040 A1    Jan. 21, 2016

(51) Int. Cl.
*C01B 32/23*    (2017.01)
*H01G 11/86*    (2013.01)

(52) U.S. Cl.
CPC ............ *H01G 11/86* (2013.01); *C01B 32/23* (2017.08)

(58) Field of Classification Search
CPC ... B82Y 40/00; C01B 31/043; C01B 31/0446; C01B 31/0476; H01G 11/86; H01M 4/364; H01M 4/485
See application file for complete search history.

(56) References Cited

U.S. PATENT DOCUMENTS 8,611,070 B2    12/2013  Ivanovici et al.
2005/0245622 A1*  11/2005  Beijense ............... B01J 23/60
                                                518/716
(Continued)

FOREIGN PATENT DOCUMENTS

CN    101993064 A    3/2011
CN    102208639 A    10/2011
(Continued)

OTHER PUBLICATIONS

Li et al Preparation of Monodispersed Fe—Mo Nanoparticles as the Catalyst for CVD Synthesis of Carbon Nanotubes, Chem. Mater. 2001, 13, 1008-1014.*
(Continued)

*Primary Examiner* — Nathan H Empie

(57) ABSTRACT

Methods of making metal oxide-graphene composites are disclosed. The methods can include, for example, providing a composition including graphene oxide and at least one substrate, the composition being dispersed in a liquid medium. The methods can also include, for example, providing a composition including graphene oxide and at least one substrate, heating the composition, and cooling the composition. Compositions useful for performing the methods and composites obtained by the process are also disclosed.

19 Claims, 10 Drawing Sheets

(56) References Cited

U.S. PATENT DOCUMENTS

| | | | |
|---|---|---|---|
| 2011/0129675 A1* | 6/2011 | Choi | H01L 31/03522 428/408 |
| 2011/0256014 A1 | 10/2011 | Hong et al. | |
| 2011/0292570 A1* | 12/2011 | Ivanovici | B82Y 30/00 361/502 |
| 2012/0021224 A1 | 1/2012 | Everett et al. | |
| 2012/0192931 A1* | 8/2012 | Jeon | B82Y 30/00 136/252 |
| 2012/0205606 A1 | 8/2012 | Lee et al. | |

FOREIGN PATENT DOCUMENTS

| | | | | |
|---|---|---|---|---|
| CN | 102315433 A | 1/2012 | | |
| CN | 102329976 A | 1/2012 | | |
| CN | 102500755 A | 6/2012 | | |
| CN | 102646817 A | 8/2012 | | |
| JP | 2011105569 A | * | 6/2011 | |
| TW | 201206712 A | 2/2012 | | |
| WO | WO 2011016616 A2 | * | 2/2011 | B82Y 30/00 |
| WO | 2012047372 A1 | 4/2012 | | |

OTHER PUBLICATIONS

Zhang, J., et al., "Graphene-metal-oxide composites for the degradation of dys under visible light irradiation," Journal of Materials Chemistry, vol. 21, pp. 3634-3640 (2011).

Fan, Z., "An environmentally friendly and efficient route for the reduction of graphene oxide by aluminum powder," Carbon, vol. 48, Issue 5, pp. 1686-1689 (Apr. 2010).

Fan, Z-J., et al., "Facile Synthesis of Graphene Nanosheets via Fe Reduction of Exfoliated Graphite Oxide," ACS Nano, 2011, vol. 5, No. 1, pp. 191-198 (Dec. 7, 2010).

International Search Report and Written Opinion for International Application No. PCT/CN2012/082464, dated Jul. 11, 2013.

International Search Report and Written Opinion for International Application No. PCT/CN2013/072182, dated Dec. 12, 2013.

Lake, J. R., et al., "Graphene metal oxide composite supercapacitor electrodes," Journal of Vacuum Science & Technology B, vol. 30, Issue 3, pp. 03D118-1-03D118-6 (2012).

Lu, T., et al., "Electrochemical behaviors of graphene-ZnO and graphene-SnO2 composite films for supercapacitors," Electrochimica Acta, vol. 55, Issue 13, pp. 4170-4173 (May 1, 2010).

Sarkar, S., and Basak, D., "The reduction of graphene oxide by zinc powder to produce a zinc oxide-reduced graphene oxide hybrid and its superior photocatalytic activity," Chemical Physics Letters, vol. 561-562, pp. 125-130 (Mar. 13, 2013).

Song, W., et al., "Graphene Decorated with ZnO Nanocrystals with Improved Electrochemical Properties Prepared by a Facile In Situ Hydrothermal Route," International Journal of electrochemical Science, vol. 7, pp. 2164-2174 (Mar. 1, 2012).

Zhao, Y., et al., "A facile route to the synthesis copper oxide/reduced graphene oxidenanocomposites and electrochemical detection of catechol organic pollutant," CrystEngComm, vol. 14, pp. 6710-6719 (Jun. 21, 2012).

Zhu, J., et al., "Facile synthesis of metal oxide/reduced graphene oxide hybrids with high lithium storage capacity and stable cyclability," Nanoscale, vol. 3, Issue 3, pp. 1084-1089 (Mar. 22, 2011).

Sarkar, Sanjit et al., The reduction of graphene oxide by zinc power to produce a zinc oxide-reduced graphene oxide hybrid and its superior photocatalytic activity, Chemical Physics Letters, Feb. 2013, vol. 561-562, pp. 125-130.

Fan, Zhuang-Jun et al., Facile Synthesis of Graphene Nanosheets via Fe Reduction of Exfoliated Graphite Oxide, ACS NANO, Dec. 2010, vol. 5, No. 1, pp. 191-198.

International Search Report dated Dec. 12, 2013 for PCT/CN2013/072182 filed Mar. 5, 2013.

* cited by examiner

PREPARATION OF METAL OXIDE-GRAPHENE COMPOSITE FILMS

CROSS-REFERENCE TO RELATED APPLICATION

The present application is the U.S. National Phase filing under 35 U.S.C. § 371 of International Application No. PCT/CN2013/072182 entitled "PREPARATION OF METAL OXIDE-GRAPHENE COMPOSITE FILMS", filed on Mar. 5, 2013. The content of this application is herein incorporated by reference in its entirety.

BACKGROUND

Unless otherwise indicated herein, the materials described in this section are not prior art to the claims in this application and are not admitted to be prior art by inclusion in this section.

Functional metal oxide materials that include reduced graphene oxide have important applications in various fields, such as energy, electronics, information, and environment protection. Such materials in thin film have increased response speed and sensitivity. Moreover, the formation of thin film can reduce cost by effectively reducing the amount of materials used. Therefore, there is a need for methods for preparing thin films of functional, metal oxide-graphene materials.

SUMMARY

Some embodiments disclosed herein are related to a method of making a metal oxide-graphene composite. The method can include: providing a composition comprising graphene oxide and at least one metal-containing substrate, the composition being dispersed in a liquid medium; and forming the metal oxide-graphene composite.

In some embodiments, the graphene oxide is present in the liquid medium at a concentration of about 0.01 mg/mL to about 10 mg/mL.

In some embodiments, the at least one metal-containing substrate comprises one or more of Fe, Zn, Mn, Ni, Cu, Co, Ti, and Sn. In some embodiments, the at least one metal-containing substrate comprises an inert material and an active substance.

In some embodiments, the inert material comprises at least one or more of glass, ceramic, stainless steel, Au, Ag, Pt, Si, and quartz. In some embodiments, the inert material comprises at least one or more of polytetrafluoroethylene, polyvinyl chloride, polyurethane, polycarbonate, poly(ethylene terephthalate), polyethylene, polypropylene, polystyrene, polymethyl methacrylate, and polyvinylidene fluoride.

In some embodiments, the active substance comprises one or more of Fe, Zn, Mn, Ni, Cu, Co, Ti, and Sn. In some embodiments, the active substance forms a layer having a thickness of at least about 1 nm.

Some embodiments disclosed herein are related to a method of making a metal oxide-graphene composite. The method can include: providing a composition comprising graphene oxide and at least one inert substrate, the composition being dispersed in a liquid medium to form a mixture, wherein the mixture comprises a metal powder; and forming the metal oxide-graphene composite.

In some embodiments, the at least one inert substrate comprises one or more of glass, ceramic, stainless steel, Au, Ag, Pt, Si, and quartz. In some embodiments, the at least one inert substrate comprises at least one or more of polytetrafluoroethylene, polyvinyl chloride, polyurethane, polycarbonate, poly(ethylene terephthalate), polyethylene, polypropylene, polystyrene, polymethyl methacrylate, and polyvinylidene fluoride.

In some embodiments, the composition comprises the metal powder. In some embodiments, the method includes adding the metal powder into the liquid medium. In some embodiments, the metal powder comprises one or more of zinc powder, iron powder, cobalt powder, nickel powder, manganese powder, tin powder, titanium powder, and copper powder. In some embodiments, the metal powder and graphene oxide are present in the mixture at a ratio of at least about 1:10.

In some embodiments, the graphene oxide is present at a concentration of about 0.01 mg/mL to about 10 mg/mL. In some embodiments, the method further includes isolating the metal oxide-graphene composite from the liquid medium.

In some embodiments, the method includes forming the metal oxide-graphene composite comprises heating the composition. In some embodiments, forming the metal oxide-graphene composite is performed at a temperature of about room temperature to about 240° C. In some embodiments, forming the metal oxide-graphene composite further comprises cooling the composition. In some embodiments, forming the metal oxide-graphene composite is performed for at least about 0.5 hours.

In some embodiments, forming the metal oxide-graphene composite further includes heating the composition in a sealed chamber at a temperature above a nominal boiling point of the liquid medium.

In some embodiments, the liquid medium comprises water, at least one organic solvent, or both. In some embodiments, the liquid medium comprises one or more of dimethylformamide, $C_{1-8}$ alkanol, N-methyl pyrrolidone, N,N-dimethylacetamide, and dimethyl sulfoxide.

Some embodiments disclosed herein are related to a method of making a metal oxide-graphene composite. The method includes: providing a composition comprising graphene oxide and at least one metal-containing substrate; heating the composition; and cooling the composition.

In some embodiments, the at least one metal-containing substrate comprises one or more of Fe, Zn, Mn, Ni, Cu, Co, Ti, and Sn. In some embodiments, the at least one metal-containing substrate comprises an inert material and an active substance.

In some embodiments, the inert material comprises at least one or more of glass, ceramic, stainless steel, Au, Ag, Pt, Si, and quartz. In some embodiments, the inert material comprises at least at least one or more of polytetrafluoroethylene, polyvinyl chloride, polyurethane, polycarbonate, poly(ethylene terephthalate), polyethylene, polypropylene, polystyrene, polymethyl methacrylate, and polyvinylidene fluoride. In some embodiments, the active substance comprises one or more of Fe, Zn, Mn, Ni, Cu, Co, Ti, and Sn. In some embodiments, the active substance forms a layer having a thickness of at least about 1 nm.

Some embodiments disclosed herein are related to a method of making a metal oxide-graphene composite. The method includes: providing a composition comprising graphene oxide, at least one inert substrate, and a metal powder; heating the composition; and cooling the composition.

In some embodiments, the at least one inert substrate comprises one or more of glass, ceramic, stainless steel, Au, Ag, Pt, Si, and quartz. In some embodiments, the at least one inert substrate comprises at least one or more of polytetrafluoroethylene, polyvinyl chloride, polyurethane, polycarbonate, poly(ethylene terephthalate), polyethylene, polypropylene, polystyrene, polymethyl methacrylate, and polyvinylidene fluoride.

In some embodiments, the metal powder comprises one or more of zinc powder, iron powder, cobalt powder, nickel powder, manganese powder, tin powder, titanium powder, and copper powder. In some embodiments, the metal powder and graphene oxide are present in the composition at a ratio of at least about 1:10.

In some embodiments, the heating step is performed at a temperature of at least about 30° C. In some embodiments, the heating step is performed for at least about 0.5 hours.

In some embodiments, the method further includes isolating the metal oxide-graphene composite. In some embodiments, the metal oxide-graphene composite forms a film. In some embodiments, the metal oxide-graphene film has a thickness of at least about 1 nm.

Some embodiments disclosed herein are related to a composition for making a metal oxide-graphene composite in situ. The composition includes: at least one substrate; and graphene oxide.

In some embodiments, the at least one substrate and the graphene oxide are dispersed in a liquid medium. In some embodiments, the at least one substrate comprises one or more of Fe, Zn, Mn, Ni, Cu, Co, Ti, and Sn. In some embodiments, the at least one substrate is an inert material. In some embodiments, the inert material comprises one or more of glass, ceramic, stainless steel, Au, Ag, Pt, Si, and quartz. In some embodiments, the inert material comprises at least one or more of polytetrafluoroethylene, polyvinyl chloride, polyurethane, polycarbonate, poly(ethylene terephthalate), polyethylene, polypropylene, polystyrene, polymethyl methacrylate, and polyvinylidene fluoride.

In some embodiments, the inert material comprises an active substrate. In some embodiments, the active substrate comprises one or more of Fe, Zn, Mn, Ni, Cu, Co, Ti, and Sn.

In some embodiments, the composition further includes a metal powder.

Some embodiments disclosed herein are related to an article for devices comprising a metal oxide-graphene composite, where said devices comprise electrochemical sensors, chemical sensors, supercapacitors, lithium ion batteries, photocatalysts, or light emitting diodes.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
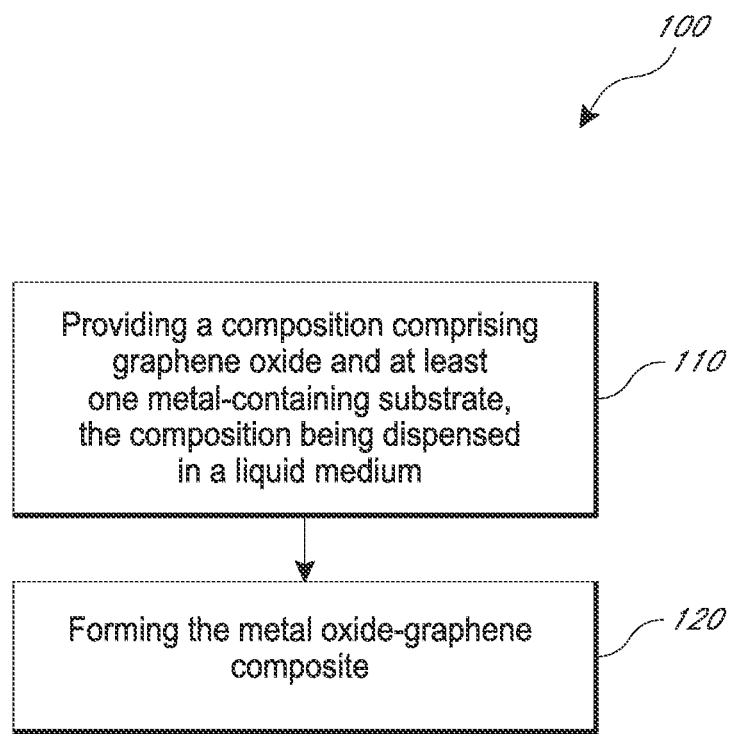
FIG. 1 is a flow diagram showing one example of methods of making a metal oxide-graphene composite from a composition comprising graphene oxide and at least one metal-containing substrate that is within the scope of the present application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Definition

As used herein, "$C_a$ to $C_b$" or "$C_{a-b}$" in which "a" and "b" are integers refer to the number of carbon atoms in the specified group. That is, the group can contain from "a" to "b", inclusive, carbon atoms. Thus, for example, a "$C_1$ to $C_4$ alkyl" or "$C_{1-4}$ alkyl" group refers to all alkyl groups having from 1 to 4 carbons, that is, $CH_3$—, $CH_3CH_2$—, $CH_3CH_2CH_2$—, $(CH_3)_2CH$—, $CH_3CH_2CH_2CH_2$—, $CH_3CH_2CH(CH_3)$— and $(CH_3)_3C$—.

As used herein, "$C_{1-8}$ alkanol" refers to a linear, branched, or cyclic alcohol such as methanol, ethanol, isopropanol, cyclohexanol, and octanol.

As used herein, the "nominal boiling point" refers to the temperature at which the liquid medium exhibits a phase change to a gas at 1 atm pressure. For example, the nominal boiling point of water is 100° C.

As used herein, "metal-containing" refers to metal substances in various forms (including, but not limited to, powders, colloids, materials, and the like) or non-metal substances having metal. The metal can be, for example, elemental metal, metal oxides, metal salts (such as inorganic salts or organic salts), metal complexes, and the like. Non-limiting examples of metal powders include zinc powder, iron powder, cobalt powder, nickel powder, manganese powder, tin powder, titanium powder, copper powder, and any combinations thereof. The metal powder can include elemental metal. Metal colloids can be, for example, suspensions of metal in liquid mediums. Metal materials, for example, can range in size, shape, or form of metal. The non-metal substance can range in any shape, size, or form, and can have metal, as described above, embedded or attached to the surface of the non-metal substance. A metal-containing substance (e.g., a metal-containing substrate) can be substantially free of metal oxides, metal salts, metal complexes, or a combination thereof. In some embodiments, the metal-containing substrate is substantially free of metal oxides. In some embodiments, the metal-containing substrate is substantially free of metal salts.

As used herein, "inert substrate" or "inert material" refers to a material that is not readily amendable to be used in the methods described herein. Non-limiting examples of an inert substrate or inert material include, but are not limited to, glass, ceramic, stainless steel, Au, Ag, Pt, Si, quartz, polytetrafluoroethylene, polyvinyl chloride, polyurethane, polycarbonate, poly(ethylene terephthalate), polyethylene, polypropylene, polystyrene, polymethyl methacrylate, polyvinylidene fluoride, and combinations thereof.

As used herein, "active substrate" refers to a material that is readily amendable to be used in the methods described herein. Non-limiting examples of an active substrate include, but are not limited to, elemental metal, such as Fe, Zn, Mn, Ni, Cu, Co, Ti, Sn.

The present disclosure provides methods of making metal oxide-graphene composites, as well as compositions useful for performing the methods and composites prepared by the methods. The method can include, in some embodiments, providing a composition comprising graphene oxide and forming the metal oxide-graphene composite. The composition can include at least one metal-containing substrate, and can be dispersed in a liquid medium. The composition can include, in some embodiments, at least one inert substrate and a metal powder. In some embodiments, the composition can be heated and then cooled to form the metal oxide-graphene composite.

FIG. 1 is a flow diagram illustrating one example of method 100 of making a metal oxide-graphene composite in accordance with at least some examples of the present disclosure. As illustrated in FIG. 1, method 100 can include one or more functions, operations, or actions as illustrated by one or more of operations 110-120.

Processing for 100 can begin at operation 110, "Providing a composition comprising graphene oxide and at least one metal-containing substrate, the composition being dispersed in a liquid medium." Operation 110 can be followed by operation 120, "Forming the metal oxide-graphene composite."

In FIG. 1, operations 110-120 are illustrated as being performed sequentially with operation 110 first and operation 120 last. It will be appreciated however that these operations can be reordered, combined, and/or divided into additional or different operations as appropriate to suit particular embodiments. In some embodiments, additional operations can be added. In some embodiments, one or more of the operations can be performed at about the same time.

At operation 110, "Providing a composition comprising graphene oxide and at least one metal-containing substrate, the composition being dispersed in a liquid medium," a suitable composition is obtained for processing into a composite. The composition can include at least one metal-containing substrate (e.g., one, two, three, or more metal-containing substrates). In some embodiments, the composition includes only one metal-containing substrate. The metal-containing substrate can have, for example, conducting properties, semiconducting properties, or insulating properties.

The size of the metal-containing substrate is also not particularly limited. For example, the metal-containing substrate can range in size from several decimeters in length, several decimeters in width, and several decimeters in height, provided that the metal-containing substrate can fit within appropriate experimental apparatuses. For example, the metal-containing substrate can have a size from about 0.1 mm$^2$ to about 500000 mm$^2$, about 0.25 mm$^2$ to about 250000 mm$^2$, about 1 mm$^2$ to about 100000 mm$^2$, about 10 mm$^2$ to about 50000 mm$^2$, about 100 mm$^2$ to about 10000 mm$^2$, or about 500 mm$^2$ to about 5000 mm$^2$. In some embodiments, the metal-containing substrate has a size from about 0.5 mm×0.5 mm to about 500 mm×500 mm to yield uniform metal oxide-graphene composite films.

The metal-containing substrate can also range in shape or form. For example, the metal-containing substrate may have multiple sides. In some embodiments, the at least one metal-containing substrate can be a three dimensional rectangle. In some embodiments, the at least one metal-containing substrate can be a thin sheet. In some embodiments, the at least one metal-containing substrate can be rigid. In some embodiments, the at least one metal-containing substrate can be flexible. The metal-containing substrate can be porous or solid.

The metal-containing substrate can include metals, including Fe, Zn, Mn, Ni, Cu, Co, Ti, and Sn. In some embodiments, the metal-containing substrate contains an elemental metal.

In some embodiments, the metal-containing substrate can include an inert material. In some embodiments, the metal-containing substrate can include an inert material having an active substance that contains metal. In some embodiments, the inert material can include glass, ceramic, stainless steel, Au, Ag, Pt, Si, quartz, polytetrafluoroethylene, polyvinyl chloride, polyurethane, polycarbonate, poly(ethylene terephthalate), polyethylene, polypropylene, polystyrene, polymethyl methacrylate, polyvinylidene fluoride, or any combination thereof.

The active substance can be located in varying positions in relation to the inert material. In some embodiments, the active substance can be partially or entirely embedded in the inert material. In some embodiments, the active substance can be partially or entirely deposited on the surface of the inert material. The active substance can partially or entirely cover the surface of the inert material. For example, the active substance can cover at least about 1%, at least about 5%, at least about 10%, at least about 20%, at least about 50%, about 75%, about 85%, about 90%, about 95%, about 99%, or more of the surface of the inert material. As other non-limiting examples, the active substance can cover no more than 99%, no more than about 95%, no more than about 90%, no more than about 80%, no more than about 60%, no more than about 50%, or less of the surface of the insert material. In some embodiments, the active substance substantially covers the surface of the inert material. In some embodiments, the active substance covers the entire surface of the inert material. The deposition is accomplished using standard techniques, including but not limited to a sputtering process or chemical deposition. The active substance, in some embodiments, can include one or more of Fe, Zn, Mn, Ni, Cu, Co, Ti, and Sn.

In some embodiments, the active substance in the metal-containing substrate can form a layer that varies in thickness. For example, the layer of active substance can have a thickness of about 1 nm to about 200 µm. In some embodiments, the layer of active substance can have a thickness of about at least about 5 nm. In some embodiments, the layer of active substance can have a thickness of about 1 nm.

The composition can also include graphene oxide. The graphene oxide can be obtained by a variety of methods known in the art and the present disclosure is not limited to graphene oxide obtained by any particular methods or process. In some embodiments, the graphene oxide can be formed using a Hummers or modified Hummers process to oxidize graphite. For example, graphite can be treated using a mixture of sulfuric acid, sodium nitrate, and potassium permanganate to obtain the graphene oxide. Other methods of forming the graphene oxide can also be utilized. In some embodiments, the graphene oxide can be sufficiently oxidized so that the graphene oxide can be dispersed in a polar solvent (e.g., water) at a concentration of at least about 0.01 mg/mL. In some embodiments, the graphene oxide can be sufficiently oxidized so that it can be dispersed in a polar solvent (e.g., water) at a concentration of at least about 0.1 mg/mL.

The amount of graphene oxide dispersed within the liquid medium is not particularly limited. The amount of graphene oxide dispersed within the liquid medium can be, for example, at least about 0.005 mg/mL; at least about 0.01 mg/mL; at least about 0.05 mg/mL; or at least about 0.1 mg/mL. The amount of graphene oxide dispersed within the liquid medium can be, for example, less than or equal to about 15 mg/mL; less than or equal to about 10 mg/mL; less than or equal to about 5 mg/mL; less than or equal to about 1 mg/mL; or less than or equal to about 0.7 mg/mL. In some embodiments, the amount of graphene oxide dispersed within the liquid medium can be about 0.01 mg/mL to about 10 mg/mL, about 0.005 mg/mL to about 10 mg/mL, or about 0.1 mg/mL to about 1 mg/mL.

The relative amount of graphene oxide to the at least one metal-containing substrate in the composition can vary, for example, to adjust the composition of the resulting metal oxide-graphene composite. The relative amount of graphene oxide to the metal-containing substrate by weight in the composition can be, for example, at least about 1:100; at least about 1:10; at least about 2:5; at least about 1:4; at least about 1:2; or at least about 3:4.

The liquid medium in the composition can be various liquids. The liquid medium can be, for example, any inert liquid in which the composition having the metal-containing substrate and graphene oxide can be dispersed. The liquid medium can also be selected such that it is readily separated from the composite after performing the method. In some embodiments, the liquid medium includes water, at least one organic solvent, or both. In some embodiments, the organic solvent can be dimethylformamide, $C_{1-8}$ alkanol, N-methyl pyrrolidone, N,N-dimethylacetamide, and dimethyl sulfoxide.

The amount of water in the liquid medium by volume can be, for example, at least about 20%; at least about 40%; at least about 60%; at least about 80%; at least about 90%; or at least about 95%. The amount of organic solvent in the liquid medium by volume can be, for example, at least about 20%; at least about 40%; at least about 60%; at least about 80%; at least about 90%; or at least about 95%. In some embodiments, the liquid medium includes less than 5% by volume of organic solvent, or is substantially free of organic solvent.

The pH of the liquid medium is also not strictly limited. However, because graphene oxide likely precipitates in high pH (about greater than pH 11) or low pH (e.g. about less than pH 2), a pH close to neutral value can be used.

The metal-containing substrate and graphene oxide can be dispersed in the liquid medium using standard techniques, such as sonication, high-shear mixing, magnetic stir bar, and the like. The present application is therefore not limited to any particular method of dispersing the metal-containing substrate and graphene oxide. Furthermore, the metal-containing substrate and graphene oxide can be sequentially dispersed in the liquid medium, or dispersed at about the same time. The metal-containing substrate and graphene oxide can also be separately dispersed in different liquid mediums (having the same or different solvents) which are subsequently intermixed to obtain the composition. In some embodiments, the composition is a suspension. In some embodiments, the composition is a generally homogenous mixture.

Various other optional additives can be included in the composition, such as dispersants, surfactants, anti-foaming agents, and the like. The amount of optional additives in the compositions can be, for example, less than or equal to about 0.05 mg/mL; less than or equal to about 0.01 mg/mL; or less than or equal to about 0.001 mg/mL. In some embodiments, the amount of optional additives in the composition is 0.0001 mg/mL to about 0.05 mg/mL. In some embodiments, the composition is substantially free of optional additives.

The composition can, for example, include low amounts of metal salts or is substantially free of metal salts. The composition can include, for example, no more than about 0.1 mg/mL of metal salts, or no more than about 0.01 mg/mL of metal salts. In some embodiments, the composition is substantially free of metal salts. By including low amounts of metal salts, in some embodiments, the methods disclosed herein can provide an efficient process with low amounts of byproducts (or free of byproducts) and/or diminished environmental impact.

The composition can, for example, include low amounts of metal salts or is substantially free of metal salts, where the metal salts are one or more salts of Ni, Mn, Fe, Zn, Sn, Cu, Ti, and Co. The composition can include, for example, no more than about 0.1 mg/mL of these metal salts, or no more than about 0.01 mg/mL of these metal salts. In some embodiments, the composition is substantially free of these metal salts.

In some embodiments, the composition includes low amounts of organometallic salts or is substantially free of organometallic salts. For example, the composition can be substantially free of copper acetate, iron acetylacetonate, zinc acetate, and/or tin acetate. The composition can include, for example, no more than about 0.1 mg/mL of organometallic salts, or no more than about 0.01 mg/mL of organometallic salts.

In some embodiments, the composition includes low amounts of organometallic salts or is substantially free of organometallic salts, where the organometallic salts are one or more salts of Ni, Mn, Fe, Zn, Sn, Cu, Ti, and Co. The composition can include, for example, no more than about 0.1 mg/mL of these organometallic salts, or no more than about 0.01 mg/mL of these organometallic salts.

In some embodiments, the composition includes low amounts of halide salts or is substantially free of halide salts. For example, the composition can be substantially free of $NiCl_2$, $FeCl_3$, and/or $TiCl_3$. The composition can include, for example, no more than about 0.1 mg/mL of halide salts, or no more than about 0.01 mg/mL of halide salts.

At operation 120, "forming the metal oxide-graphene composite," the composition can be formed at temperature range of about room temperature to about 300° C. In some embodiments, the composition can be formed at about room temperature to about 240° C. In some embodiments, the composition can be formed at about room temperature in a sealed chamber. In some embodiments, the composition can be formed at about room temperature in an open chamber.

In some embodiments, the composition is heated below the nominal boiling point to facilitate forming the composite. In some embodiments, the composition is heated above the nominal boiling point to facilitate forming the composite.

The composition can be heated in the sealed chamber at a temperature that is effective to form the composite. The composition can be heated in the sealed chamber at a temperature of, for example, at least about 100° C.; at least about 125° C.; at least about 150° C.; at least about 200° C.; or at least about 250° C. The composition can be heated in the sealed chamber at a temperature of, for example, less than or equal to about 500° C.; less than or equal to about 400° C.; less than or equal to about 300° C.; or less than or equal to about 200° C. In some embodiments, the composition can be heated in the sealed chamber at a temperature of about 100° C. to about 500° C., or about 125° C. to about 300° C. In some embodiments, the metal-containing substrate includes low amounts of elemental metal or is substantially free of elemental metals.

The composition can also be heated for a time period that is effective to form the composite. The composition can be heated for a time period of, for example, at least about 30 minutes; at least about 1 hour; at least about 4 hours; at least about 12 hours; or at least about 24 hours. The composition can be heated for a time period of, for example, less than or equal to about 100 hours; less than or equal to about 48 hours; less than or equal to about 24 hours; or less than or equal to about 12 hours. In some embodiments, the composition can be heated for a time period of about 30 minutes to about 100 hours, or about 4 hours to about 24 hours.

Heating the composition in the sealed chamber can also produce an increased pressure. The pressure in the sealed chamber while heating the composition can reach, for example, more than 1 atm; at least about 1.2 atm; at least about 1.5 atm; or at least about 2 atm.

The sealed chamber is not particularly limited and can generally be any inert container that withstands the temperatures and pressures applied during the process. As a non-limiting example, the sealed chamber can be an autoclave that is heated in a furnace or oven. The volume of the sealed chamber filled with the composition can also vary. For example, the sealed chamber can be half-filled with the composition. The amount of the composition in the sealed chamber by volume relative to a total volume of the sealed chamber can be, for example, at least about 10%; at least about 20%; at least about 40%; at least about 50%; or at least about 60%.

Heating the composition under appropriate conditions can yield a metal oxide-graphene composite. Without being bound to any particular theory, it is believed the metal-containing substrate and graphene oxide complete a reduction-oxidation reaction to obtain the composite. Thus, at least a portion of the graphene in the composite can be reduced graphene oxide. The metal oxide within the composite can vary depending on the elemental metals used in the composition. Non-limiting examples of metal oxides that can be included in the composite are nickel oxide (e.g., NiO or $Ni(OH)_2$), manganese oxide (e.g., $Mn_3O_4$ or MnO2), iron oxide (e.g., FeO, $Fe_2O_3$, or $Fe_3O_4$), zinc oxide, tin oxide, copper oxide (e.g., $Cu_2O$ or CuO), titanium dioxide (e.g., $TiO_2$), and cobalt oxide (e.g., CoO, $Co_2O_3$, or $Co_3O_4$).

In some embodiments, at operation 120, "forming the metal oxide-graphene composite," the composition can be cooled. In some embodiments, the cooling step may be performed after the composition is heated. In some embodiments, the heat source can no longer be applied to the composition, thereby allowing the composition to cool on its own. In some embodiments, a cooling source can be applied to the composition.

The relative amount of metal oxides to graphene in the metal oxide-graphene composite can be varied, for example, by adjusting the relative amount of metal-containing substrate and graphene oxide in the composition. The relative amount of metal oxides to graphene by weight can be, for example, at least about 1:10; at least about 1:5; at least about 1:3; at least about 1:1; or at least about 3:1. The relative amount of metal oxides to graphene by weight can be, for example, less than or equal to about 10:1; less than or equal to about 5:1; less than or equal to about 3:1; less than or equal to about 1:1; or less or equal to about 1:3. In some embodiments, the relative amount of metal oxides to graphene by weight is about 1:10 to about 10:1, or about 1:3 to about 3:1.

The composite can, in some embodiments, include a crystalline or semi-crystalline metal oxide. In some embodiments, the metal oxide has a degree of crystallinity of at least about 50%, or at least about 75%.

Figure 7:
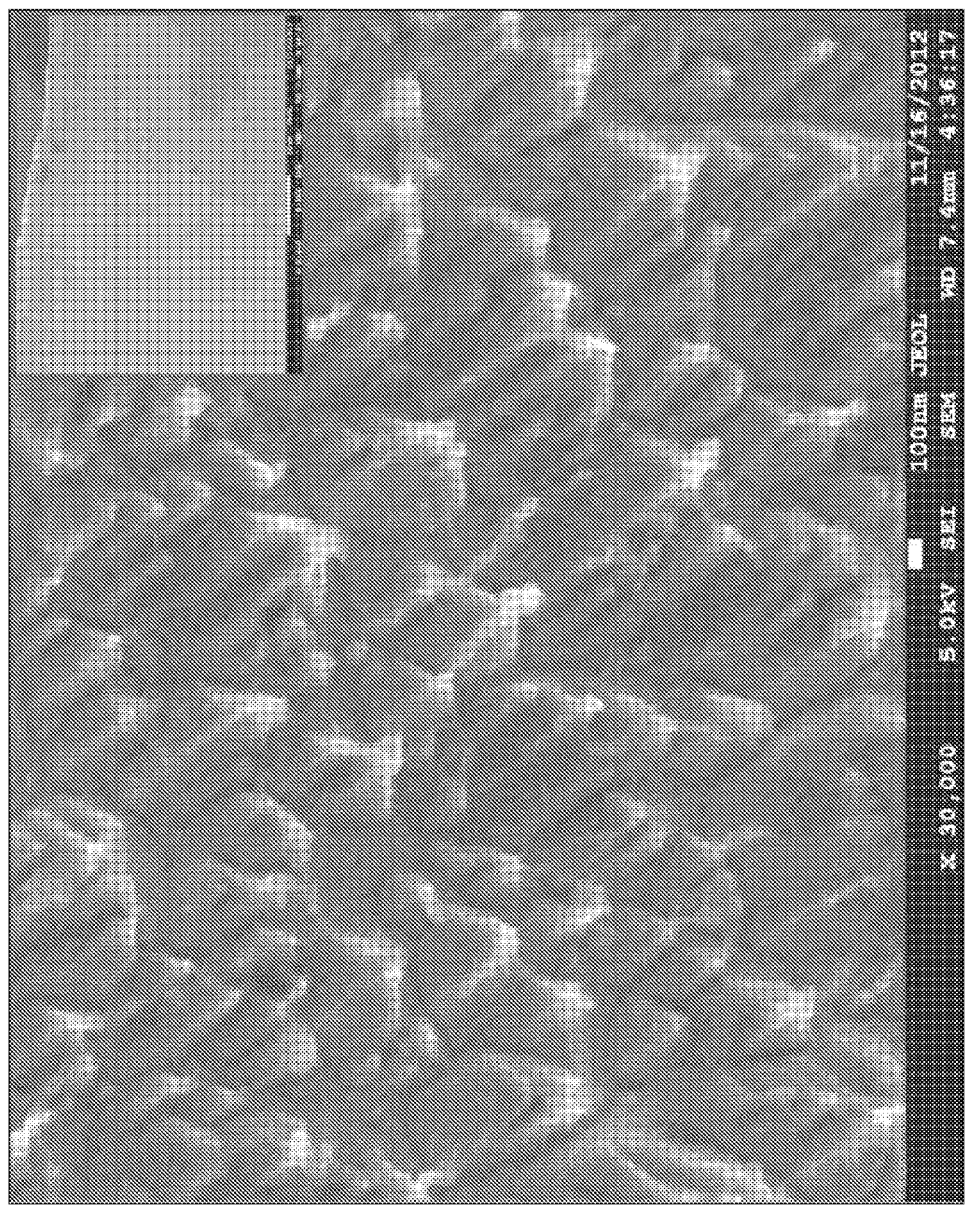
FIG. 7 shows a scanning electron microscopy image of a $Ni(OH)_2$-graphene composite prepared according to Example 1.

The composite can, in some embodiments, include graphene wrapping the metal oxide. An example of graphene wrapping the metal oxide is shown in FIG. 7 which has a $Ni(OH)_2O$-graphene composite prepared according to Example 1 below. In some embodiments, the composite preferentially includes graphene wrapping the metal oxide relative to graphene having metal oxide covering the surface of the graphene. For an example of composites having metal oxide covering the surface of graphene see Electochimica Acta, Vol. 55, (2010), pp. 4170-73.

Method 100, in some embodiments, can include isolating the metal oxide-graphene composite from the liquid medium. The present application is not limited to any particular technique for isolating the composite. Non-limiting examples of suitable techniques include filtration, centrifugation, and sedimentation. Two or more isolation techniques can be optionally combined. Generally, a solid form of the composite can be isolated. In some embodiments, the isolated composite can be washed to remove other materials and loose particles.

Figure 2:
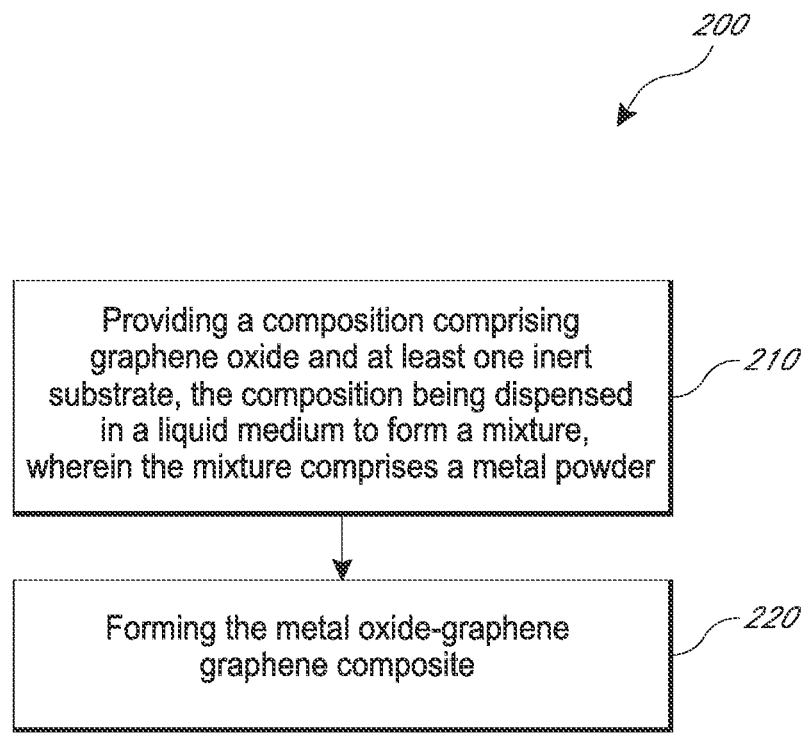
FIG. 2 is a flow diagram showing one example of methods of making a metal oxide-graphene composite from a composition comprising graphene oxide and at least one inert substrate that is within the scope of the present application.

FIG. 2 is a flow diagram illustrating one example of method 200 of making a metal oxide-graphene composite in accordance with at least some examples of the present disclosure. As illustrated in FIG. 2, method 200 can include one or more functions, operations, or actions as illustrated by one or more of operations 210-220.

Processing for 200 can begin at operation 210, "Providing a composition comprising graphene oxide and at least one inert substrate, the composition being dispersed in a liquid medium to form a mixture, wherein the mixture comprises a metal powder." Operation 210 can be followed by operation 220, "Forming the metal oxide-graphene composite."

In FIG. 2, operations 210-220 are illustrated as being performed sequentially with operation 210 first and operation 220 last. It will be appreciated however that these operations can be reordered, combined, and/or divided into additional or different operations as appropriate to suit particular embodiments. In some embodiments, additional operations can be added. In some embodiments, one or more of the operations can be performed at about the same time.

At operation 210, "Providing a composition comprising graphene oxide and at least one inert substrate, the composition being dispersed in a liquid medium to form a mixture, wherein the mixture comprises a metal powder," a suitable composition is obtained for processing into a composite. The composition can include at least one inert substrate (e.g., one, two, three, or more inert substrates). In some embodiments, the composition includes only one inert substrate. The inert substrate can have conducting properties, semiconducting properties, or insulating properties.

The size of the inert substrate is also not particularly limited, and for example, can range in size from several decimeters in length, several decimeters in width, and several decimeters in height, provided that the inert substrate can fit within appropriate experimental apparatuses. For example, the inert substrate can have a size from about 0.1 mm$^2$ to about 500000 mm$^2$, about 0.25 mm$^2$ to about 250000 mm$^2$, about 1 mm$^2$ to about 100000 mm$^2$, about 10 mm$^2$ to about 50000 mm$^2$, about 100 mm$^2$ to about 10000 mm$^2$, or about 500 mm$^2$ to about 5000 mm$^2$. In some embodiments, the inert substrate has a size from about 0.5 mm×0.5 mm to about 500 mm×500 mm to yield uniform metal oxide-graphene composite films.

The shape of the inert substrate is also not particularly limited. For example, the inert substrate may have multiple sides. In some embodiments, the at least one inert substrate can be a three dimensional rectangle. In some embodiments, the at least one inert substrate can be a thin sheet. In some embodiments, the at least one inert substrate can be rigid. In some embodiments, the at least one inert substrate can be flexible.

Non-limiting examples of the inert substrate include glass, ceramic, stainless steel, Au, Ag, Pt, Si, quartz, polytetrafluoroethylene, polyvinyl chloride, polyurethane, polycarbonate, poly(ethylene terephthalate), polyethylene, polypropylene, polystyrene, polymethyl methacrylate, polyvinylidene fluoride, and combinations thereof.

The composition can also include graphene oxide. The graphene oxide is not particularly limited, and can be obtained by a variety of methods known in the art. In some embodiments, the graphene oxide can be formed using a Hummers or modified Hummers process to oxidize graphite. For example, graphite can be treated using a mixture of sulfuric acid, sodium nitrate, and potassium permanganate to obtain the graphene oxide. Other methods of forming the graphene oxide can also be utilized. In some embodiments, the graphene oxide can be sufficiently oxidized so that the graphene oxide can be dispersed in a polar solvent (e.g., water) at a concentration of at least about 0.01 mg/mL. In some embodiments, the graphene oxide can be sufficiently oxidized so that it can be dispersed in a polar solvent (e.g., water) at a concentration of at least about 0.1 mg/mL.

The amount of graphene oxide dispersed within the liquid medium is not particularly limited. The amount of graphene oxide dispersed within the liquid medium can be, for example, at least about 0.005 mg/mL; at least about 0.01 mg/mL; at least about 0.05 mg/mL; or at least about 0.1 mg/mL. The amount of graphene oxide dispersed within the liquid medium can be, for example, less than or equal to about 15 mg/mL; less than or equal to about 10 mg/mL; less than or equal to about 5 mg/mL; less than or equal to about 1 mg/mL; or less than or equal to about 0.7 mg/mL. In some embodiments, the amount of graphene oxide dispersed within the liquid medium can be about 0.01 mg/mL to about 10 mg/mL, about 0.005 mg/mL to about 10 mg/mL, or about 0.1 mg/mL to about 1 mg/mL.

The relative amount of graphene oxide to the at least one inert substrate in the composition can vary, for example, to adjust the composition of the resulting metal oxide-graphene composite. For example, the graphene oxide can be partially or entirely deposited on the surface of the inert material. The graphene oxide can partially or entirely cover the surface of the inert material. For example, the graphene oxide can cover at least about 1%, at least about 5%, at least about 10%, at least about 20%, at least about 50%, about 75%, about 85%, about 90%, about 95%, about 99%, or more of the surface of the inert material.

The liquid medium in the composition can be various liquids. The liquid medium can be, for example, any inert liquid in which the composition having the metal-containing substrate and graphene oxide can be dispersed. The liquid medium can also be selected such that it is readily separated from the composite after performing the method. In some embodiments, the liquid medium includes water, at least one organic solvent, or both. In some embodiments, the organic solvent can be dimethylformamide, $C_{1-8}$ alkanol, N-methyl pyrrolidone, N,N-dimethylacetamide, and dimethyl sulfoxide.

The amount of water in the liquid medium by volume can be, for example, at least about 20%; at least about 40%; at least about 60%; at least about 80%; at least about 90%; or at least about 95%. The amount of organic solvent in the liquid medium by volume can be, for example, at least about 20%; at least about 40%; at least about 60%; at least about 80%; at least about 90%; or at least about 95%. In some embodiments, the liquid medium includes less than 5% by volume of organic solvent, or is substantially free of organic solvent.

The pH of the liquid medium is also not strictly limited. However, because graphene oxide likely precipitates in high pH (about greater than pH 11) or low pH (e.g. about less than pH 2), a pH close to neutral value can be used.

The inert substrate and graphene oxide can be dispersed in the liquid medium using standard techniques, such as sonication, high-shear mixing, magnetic stir bar, and the like. The present application is therefore not limited to any particular method of dispersing the metal-containing substrate and graphene oxide. Furthermore, the inert substrate and graphene oxide can be sequentially dispersed in the liquid medium, or dispersed at about the same time. The inert substrate and graphene oxide can also be separately dispersed in different liquid mediums (having the same or different solvents) which are subsequently intermixed to obtain the composition. In some embodiments, the composition is a suspension. In some embodiments, the composition is a generally homogenous mixture.

The mixture formed by dispersing the composition in the liquid medium can include a metal powder. The step in which the metal powder is added to form the mixture is not particularly limited. For example, in some embodiments, the metal powder can be added to the liquid medium, where the composition is already dispersed in the liquid medium. In some embodiments, the metal powder and the composition can be simultaneously dispersed in the liquid medium. In some embodiments, the metal powder is first dispersed in the liquid medium, and the composition is subsequently dispersed in the liquid medium. Furthermore, the metal powder and the composition can also be separately dispersed in different liquid mediums (having the same or different solvents) which are subsequently intermixed to obtain the mixture. The metal powder and the composition can be dispersed in the liquid medium using standard techniques, such as sonication, high-shear mixing, magnetic stir bar, and the like. The present application is therefore not limited to any particular method of dispersing the metal-containing substrate and graphene oxide. In some embodiments, the mixture is a suspension. In some embodiments, the mixture is a generally homogenous mixture.

The metal powder can include elemental metal. In some embodiments, the metal powder can include one or more of zinc powder, iron powder, cobalt powder, nickel powder, manganese powder, tin powder, titanium powder, and copper powder.

In some embodiments, the metal powder can be granular. The granular form can have an average particle size of, for example, less than or equal to about 100 µm; less than or equal to about 10 µm; less than or equal to about 1 µm; less than or equal to about 500 nm; or less than or equal to about 100 nm. The metal powder can be comminuted into granular form using standard procedures, such as crushing, grinding, ball milling, and the like.

The amount of metal powder dispersed within the liquid medium is not particularly limited. In some embodiments, the amount of metal powder dispersed within the liquid medium is sufficient to cover the surface of the inert substrate. In some embodiments, the amount of metal powder dispersed within the liquid medium can be, for example, at least about 0.01 mg/mL; at least about 0.1 mg/mL; at least about 0.5 mg/mL; or at least about 1 mg/mL. The amount of metal powder dispersed within the liquid medium can be, for example, less than or equal to about 10 mg/mL; less than or equal to about 5 mg/mL; or less than or equal to about 3 mg/mL. In some embodiments, the amount of metal powder dispersed within the liquid medium can be about 0.01 mg/mL to about 10 mg/mL, or about 0.5 mg/mL to about 5 mg/mL.

The relative amount of metal powder to graphene oxide can also be varied, for example, to adjust the composition of the resulting metal oxide-graphene composite. The relative amount of metal powder to graphene oxide by weight can be, for example, at least about 1:10; at least about 1:5; at least about 1:3; at least about 1:1; or at least about 3:1. The relative amount of metal powder to graphene oxide by weight can be, for example, less than or equal to about 10:1; less than or equal to about 5:1; less than or equal to about 3:1; less than or equal to about 1:1; or less or equal to about 1:3. In some embodiments, the relative amount of metal powder to graphene oxide by weight is about 1:10 to about 10:1, or about 1:3 to about 3:1.

Various other optional additives can be included in the composition, such as dispersants, surfactants, anti-foaming agents, and the like. The amount of optional additives in the compositions can be, for example, less than or equal to about 0.05 mg/mL; less than or equal to about 0.01 mg/mL; or less than or equal to about 0.001 mg/mL. In some embodiments, the amount of optional additives in the composition is 0.0001 mg/mL to about 0.05 mg/mL. In some embodiments, the composition is substantially free of optional additives.

The composition can, for example, include low amounts of metal salts or is substantially free of metal salts. The composition can include, for example, no more than about 0.1 mg/mL of metal salts, or no more than about 0.01 mg/mL of metal salts. In some embodiments, the composition is substantially free of metal salts. By including low amounts of metal salts, in some embodiments, the methods disclosed herein can provide an efficient process with low amounts of byproducts (or free of byproducts) and/or diminished environmental impact.

The composition can, for example, include low amounts of metal salts or is substantially free of metal salts, where the metal salts are one or more salts of Ni, Mn, Fe, Zn, Sn, Cu, Ti, and Co. The composition can include, for example, no more than about 0.1 mg/mL of these metal salts, or no more than about 0.01 mg/mL of these metal salts. In some embodiments, the composition is substantially free of these metal salts.

In some embodiments, the composition includes low amounts of organometallic salts or is substantially free of organometallic salts. For example, the composition can be substantially free of copper acetate, iron acetylacetonate, zinc acetate, and/or tin acetate. The composition can include, for example, no more than about 0.1 mg/mL of organometallic salts, or no more than about 0.01 mg/mL of organometallic salts.

In some embodiments, the composition includes low amounts of organometallic salts or is substantially free of organometallic salts, where the organometallic salts are one or more salts of Ni, Mn, Fe, Zn, Sn, Cu, Ti, and Co. The composition can include, for example, no more than about 0.1 mg/mL of these organometallic salts, or no more than about 0.01 mg/mL of these organometallic salts.

In some embodiments, the composition includes low amounts of halide salts or is substantially free of halide salts. For example, the composition can be substantially free of $NiCl_2$, $FeCl_3$, and/or $TiCl_3$. The composition can include, for example, no more than about 0.1 mg/mL of halide salts, or no more than about 0.01 mg/mL of halide salts.

Returning to method 200, operation 220, "forming the metal oxide-graphene composite," the composition can be formed at temperature range of about room temperature to about 300° C. In some embodiments, the composition can be formed at temperature range of about room temperature to about 240° C. In some embodiments, the composition can be heated.

The composition can be heated in the sealed chamber at a temperature that is effective to form the composite. The composition can be heated in the sealed chamber at a temperature of, for example, at least about 100° C.; at least about 125° C.; at least about 150° C.; at least about 200° C.; or at least about 250° C. The composition can be heated in the sealed chamber at a temperature of, for example, less than or equal to about 500° C.; less than or equal to about 400° C.; less than or equal to about 300° C.; or less than or equal to about 200° C. In some embodiments, the composition can be heated in the sealed chamber at a temperature of about 100° C. to about 500° C., or about 125° C. to about 300° C.

The composition can also be heated for a time period that is effective to form the composite. The composition can be heated for a time period of, for example, at least about 30 minutes; at least about 1 hour; at least about 4 hours; at least about 12 hours; or at least about 24 hours. The composition can be heated for a time period of, for example, less than or equal to about 100 hours; less than or equal to about 48 hours; less than or equal to about 24 hours; or less than or equal to about 12 hours. In some embodiments, the composition can be heated for a time period of about 30 minutes to about 100 hours, or about 4 hours to about 24 hours.

Heating the composition in the sealed chamber can also produce an increased pressure. The pressure in the sealed chamber while heating the composition can reach, for example, more than 1 atm; at least about 1.2 atm; at least about 1.5 atm; or at least about 2 atm.

The sealed chamber is not particularly limited and can generally be any inert container that withstands the temperatures and pressures applied during the process. As a non-limiting example, the sealed chamber can be an autoclave that is heated in a furnace or oven. The volume of the sealed chamber filled with the composition can also vary. For example, the sealed chamber can be half-filled with the composition. The amount of the composition in the sealed chamber by volume relative to a total volume of the sealed chamber can be, for example, at least about 10%; at least about 20%; at least about 40%; at least about 50%; or at least about 60%.

Heating the composition under appropriate conditions can yield a metal oxide-graphene composite. Without being bound to any particular theory, it is believed the elemental metals and graphene oxide complete a reduction-oxidation reaction to obtain the composite. Thus, at least a portion of the graphene in the composite can be reduced graphene oxide. The metal oxide within the composite can vary depending on the elemental metals used in the composition. Non-limiting examples of metal oxides that can be included in the composite are nickel oxide (e.g., NiO or $Ni(OH)_2$), manganese oxide (e.g., $Mn_3O_4$ or $MnO_2$), iron oxide (e.g., FeO, $Fe_2O_3$, or $Fe_3O_4$), zinc oxide, tin oxide, copper oxide (e.g., $Cu_2O$ or CuO), titanium dioxide (e.g., $TiO_2$), and cobalt oxide (e.g., CoO, $Co_2O_3$, or $CO_3O_4$).

In some embodiments, at operation 220, "forming the metal oxide-graphene composite," the composition can be cooled. In some embodiments, the cooling step may be performed after the composition is heated. In some embodiments, the heat source can no longer be applied to the composition, thereby allowing the composition to cool on its own. In some embodiments, a cooling source can be applied to the composition.

The relative amount of metal oxides to graphene in the metal oxide-graphene composite can be varied, for example, by adjusting the relative amount of metal powder and graphene oxide in the composite. The relative amount of metal oxides to graphene by weight can be, for example, at least about 1:10; at least about 1:5; at least about 1:3; at least about 1:1; or at least about 3:1. The relative amount of metal oxides to graphene by weight can be, for example, less than or equal to about 10:1; less than or equal to about 5:1; less than or equal to about 3:1; less than or equal to about 1:1; or less or equal to about 1:3. In some embodiments, the relative amount of metal oxides to graphene by weight is about 1:10 to about 10:1, or about 1:3 to about 3:1.

The composite can, in some embodiments, include a crystalline or semi-crystalline metal oxide. In some embodiments, the metal oxide has a degree of crystallinity of at least about 50%, or at least about 75%.

The composite can, in some embodiments, include graphene wrapping the metal oxide. An example of graphene wrapping the metal oxide is shown in FIG. 7 which has a $Ni(OH)_2O$-graphene composite prepared according to Example 1 below. In some embodiments, the composite preferentially includes graphene wrapping the metal oxide relative to graphene having metal oxide covering the surface of the graphene. For an example of composites having metal oxide covering the surface of graphene see Electochimica Acta, Vol. 55, (2010), pp. 4170-73.

Method 200, in some embodiments, can also include isolating the metal oxide-graphene composite from the liquid medium. The present application is not limited to any particular technique for isolating the composite. Non-limiting examples of suitable techniques include filtration, centrifugation, and sedimentation. Two or more isolation techniques can be optionally combined. Generally, a solid form of the composite can be isolated. In some embodiments, the isolated composite can be washed to remove other materials and loose particles.

Figure 3:
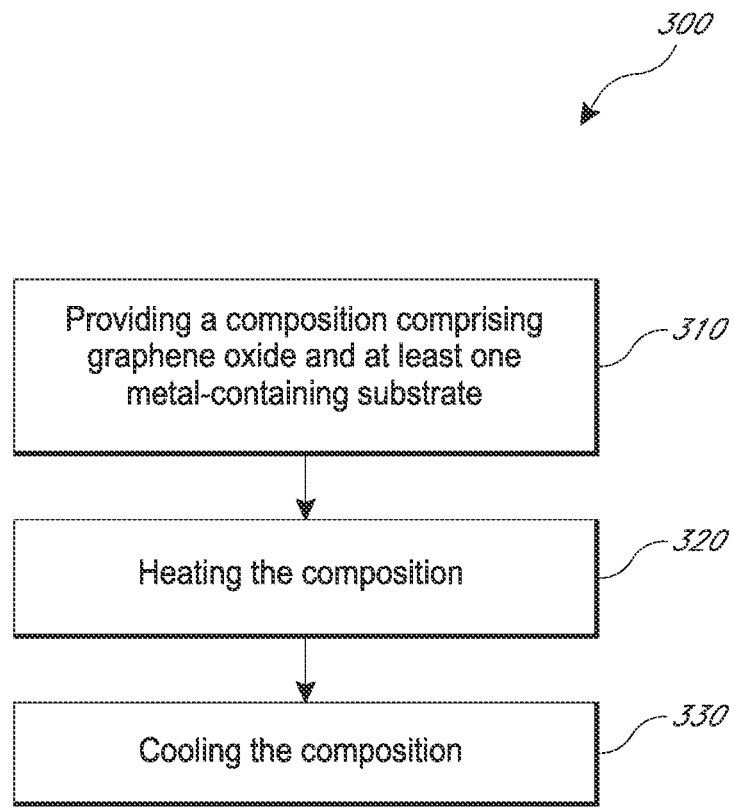
FIG. 3 is a flow diagram showing one example of methods of making a metal oxide-graphene composite from a composition comprising graphene oxide and at least one metal-containing substrate that is within the scope of the present application.

FIG. 3 is a flow diagram illustrating one example of method 300 of making a metal oxide-graphene composite in accordance with at least some examples of the present disclosure. As illustrated in FIG. 3, method 300 can include one or more functions, operations, or actions as illustrated by one or more of operations 310-330.

Processing for 300 can begin at operation 310, "Providing a composition comprising graphene oxide and at least one metal-containing substrate." Operation 310 can be followed by operation 320, "Heating the composition." Operation 320 can be followed by operation 330, "Cooling the composition."

In FIG. 3, operations 310-330 are illustrated as being performed sequentially with operation 310 first and operation 320 last. It will be appreciated however that these operations can be reordered, combined, and/or divided into additional or different operations as appropriate to suit particular embodiments. In some embodiments, additional operations can be added. In some embodiments, one or more of the operations can be performed at about the same time.

At operation 310, "Providing a composition comprising graphene oxide and at least one metal-containing substrate," a suitable composition is obtained for processing into a composite. In some embodiments, the composition is not dispersed in a liquid medium. Thus, method 300 can be performed without using any liquid medium.

The composition can include at least one metal-containing substrate (e.g., one, two, three, or more metal-containing substrates). In some embodiments, the composition includes only one metal-containing substrate. The metal-containing substrate may have conducting properties, semiconducting properties, or insulating properties.

The size of the metal-containing substrate is also not particularly limited. For example, the metal-containing substrate can range in size from several decimeters in length, several decimeters in width, and several decimeters in height, provided that the metal-containing substrate can fit within appropriate experimental apparatuses. For example, the metal-containing substrate can have a size from about 0.1 $mm^2$ to about 500000 $mm^2$, about 0.25 $mm^2$ to about 250000 $mm^2$, about 1 $mm^2$ to about 100000 $mm^2$, about 10 $mm^2$ to about 50000 $mm^2$, about 100 $mm^2$ to about 10000 $mm^2$, or about 500 $mm^2$ to about 5000 $mm^2$. In some embodiments, the metal-containing substrate has a size from about 0.5 mm×0.5 mm to about 500 mm×500 mm to yield uniform metal oxide-graphene composite films.

The metal-containing substrate can also range in shape. For example, the metal-containing substrate may have multiple sides. In some embodiments, the at least one metal-containing substrate can be a three dimensional rectangle. In some embodiments, the at least one metal-containing substrate can be a thin sheet. In some embodiments, the at least one metal-containing substrate can be rigid. In some embodiments, the at least one metal-containing substrate can be flexible.

In some embodiments, the metal-containing substrate can be a metal. Non-limiting examples of the metal can Fe, Zn, Mn, Ni, Cu, Co, Ti, and Sn. In some embodiments, the metal-containing substrate can be an elemental metal.

In some embodiments, the metal-containing substrate can include an inert material. In some embodiments, the metal-containing substrate can include an inert material having an active substance that contains metal. In some embodiments, the inert material can include glass, ceramic, stainless steel, Au, Ag, Pt, Si, quartz, polytetrafluoroethylene, polyvinyl chloride, polyurethane, polycarbonate, poly(ethylene terephthalate), polyethylene, polypropylene, polystyrene, polymethyl methacrylate, polyvinylidene fluoride, or any combination thereof.

The active substance can be located in varying positions in relation to the inert material. In some embodiments, the active substance can be partially or entirely embedded in the inert material. In some embodiments, the active substance can be partially or entirely deposited on the surface of the inert material. The active substance can partially or entirely cover the surface of the inert material. For example, the active substance can cover at least about 1%, at least about 5%, at least about 10%, at least about 20%, at least about 50%, or more of the surface of the inert material. As other non-limiting examples, the active substance can cover no more than about 95%, no more than about 90%, no more than about 80%, no more than about 60%, no more than about 50%, or less of the surface of the insert material. In some embodiments, the active substance substantially covers the surface of the inert material. In some embodiments, the active substance covers the entire surface of the inert material. The deposition is accomplished using standard techniques, including but not limited to a sputtering process or chemical deposition. The active substance, in some embodiments, can include one or more of Fe, Zn, Mn, Ni, Cu, Co, Ti, and Sn.

In some embodiments, the active substance in the metal-containing substrate forms a layer that can vary in thickness. For example, the layer of the active substance can have a thickness of about 1 nm to about 200 µm. In some embodiments, the layer of the active substance can have a thickness of about at least about 5 nm. In some embodiments, the layer of the active substance can have a thickness of about 1 nm.

As discussed above, the graphene oxide suitable to use in the methods disclosed herein is not particularly limited, and can be obtained by a variety of methods. In some embodiments, the graphene oxide can be formed using a Hummers or modified Hummers process to oxidize graphite. For example, graphite can be treated using a mixture of sulfuric acid, sodium nitrate, and potassium permanganate to obtain the graphene oxide. Other methods of forming the graphene oxide can also be utilized. The graphene oxide can be granular. The granular form can have an average particle size of, for example, less than or equal to about 100 µm; less than or equal to about 10 µm; less than or equal to about 1 µm; less than or equal to about 500 nm; or less than or equal to about 100 nm. The graphene oxide can be comminuted into granular form using standard procedures, such as crushing, grinding, ball milling, and the like.

Without being bound to any particular theory, typically the amount of graphene oxide needed is proportional to the thickness of the desired metal oxide-graphene composite desired. In some embodiments, the composition can include an amount of graphene oxide sufficient to cover the surface of the substrate. For example, the graphene oxide can cover at least about 1%, at least about 5%, at least about 10%, at least about 20%, at least about 50%, at least about 75%, at least about 85%, at least about 90%, at least about 95%, at least about 99%, or more of the surface area of the substrate.

In some embodiments, the grapheme oxide covers about 10% to about 100% of the substrate. In some embodiments, the grapheme oxide covers at least about 5% of the substrate.

Returning to method 300, operation 320, "Heating the composition," the composition can be heated at a temperature that is effective to form the composite. In some embodiments, the composition is heated under an inert atmosphere, such as nitrogen or argon atmosphere. The composition can be heated at a temperature of, for example, at least about 20° C., at least about 30° C., at least about 50° C., at least about 100° C., at least about 150° C.; at least about 200° C.; at least about 300° C.; at least about 400° C.; at least about 500° C.; at least about 600° C.; or at least about 700° C. The composition can be heated at a temperature of, for example, less than or equal to about 900° C.; less than or equal to about 700° C.; less than or equal to about 500° C.; less than or equal to about 400° C.; less than or equal to about 300° C.; or less than or equal to about 200° C. In some embodiments, the composition can be heated under an inert atmosphere at a temperature of about 100° C. to about 900° C., or about 200° C. to about 800° C.

The composition can also be heated for a time period that is effective to form the composite. The composition can be heated for a time period of, for example, at least about 30 minutes; at least about 1 hour; at least about 4 hours; at least about 12 hours; or at least about 24 hours. The composition can be heated for a time period of, for example, less than or equal to about 100 hours; less than or equal to about 48 hours; less than or equal to about 24 hours; or less than or equal to about 12 hours. In some embodiments, the composition can be heated for a time period of about 30 minutes to about 100 hours, or about 3 hours to about 24 hours.

At operation 330, "Cooling the composition," the composition can be cooled at a temperature that is effective to form the composite. In some embodiments, the heat source used at operation 320 can no longer be applied to the composition, thereby allowing the composition to cool on its own. In some embodiments, a cooling source can be applied to the composition.

Method 300, in some embodiments, can also include isolating the metal oxide-graphene composite from the liquid medium. The present application is not limited to any particular technique for isolating the composite. Non-limiting examples of suitable techniques include filtration, centrifugation, and sedimentation. Two or more isolation techniques can be optionally combined. Generally, a solid form of the composite can be isolated. In some embodiments, the isolated composite can be washed to remove other materials and loose particles.

Figure 4:
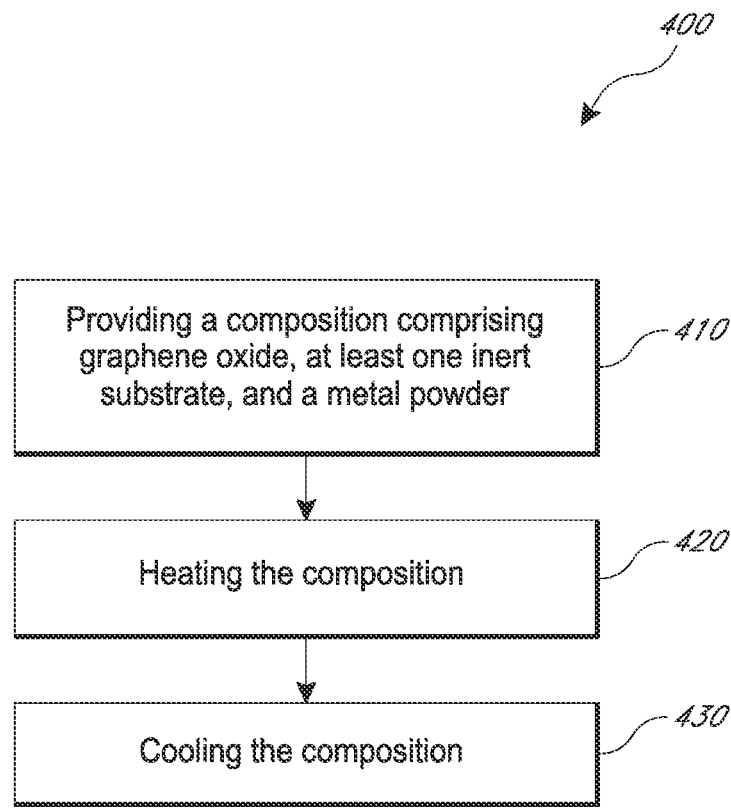
FIG. 4 is a flow diagram showing one example of methods of making a metal oxide-graphene composite from a composition comprising graphene oxide and at least one inert substrate that is within the scope of the present application.

FIG. 4 is a flow diagram illustrating one example of method 400 of making a metal oxide-graphene composite in accordance with at least some examples of the present disclosure. As illustrated in FIG. 4, method 400 can include one or more functions, operations, or actions as illustrated by one or more of operations 410-430.

Processing for 400 can begin at operation 410, "Providing a composition comprising graphene oxide, at least one inert substrate, and a metal powder." Operation 410 can be followed by operation 420, "Heating the composition." Operation 420 can be followed by operation 430, "Cooling the composition."

In FIG. 4, operations 410-430 are illustrated as being performed sequentially with operation 410 first and operation 420 last. It will be appreciated however that these operations can be reordered, combined, and/or divided into additional or different operations as appropriate to suit particular embodiments. In some embodiments, additional operations can be added. In some embodiments, one or more of the operations can be performed at about the same time.

At operation 410, "Providing a composition comprising graphene oxide, at least one inert substrate, and a metal powder," a suitable composition is obtained for processing into a composite. In some embodiments, the composition is not dispersed in a liquid medium. Thus, method 400 can be performed without using any liquid medium.

The composition can include at least one inert substrate (e.g., one, two, three, or more inert substrates). In some embodiments, the composition includes inert substrate. The size of the inert substrate is also not particularly limited. The inert substrate may have conducting properties, semiconducting properties, or insulating properties.

The size of the inert substrate is also not particularly limited. For example, the inert substrate can range in size from several decimeters in length, several decimeters in width, and several decimeters in height, provided that the inert substrate can fit within appropriate experimental apparatuses. For example, the inert substrate can have a size from about 0.1 mm$^2$ to about 500000 mm$^2$, about 0.25 mm$^2$ to about 250000 mm$^2$, about 1 mm$^2$ to about 100000 mm$^2$, about 10 mm$^2$ to about 50000 mm$^2$, about 100 mm$^2$ to about 10000 mm$^2$, or about 500 mm$^2$ to about 5000 mm$^2$. In some embodiments, the inert substrate has a size from about 0.5 mm×0.5 mm to about 500 mm×500 mm to yield uniform metal oxide-graphene composite films.

The inert substrate can also range in shape. For example, the inert substrate may have multiple sides. In some embodiments, the at least one inert substrate can be a three dimensional rectangle. In some embodiments, the at least one inert substrate can be a thin sheet. In some embodiments, the at least one inert substrate can be rigid. In some embodiments, the at least one inert substrate can be flexible. The inert substrate can be solid or porous.

Non-limiting examples of the inert substrate can be glass, ceramic, stainless steel, Au, Ag, Pt, Si, quartz, polytetrafluoroethylene, polyvinyl chloride, polyurethane, polycarbonate, poly(ethylene terephthalate), polyethylene, polypropylene, polystyrene, polymethyl methacrylate, and polyvinylidene fluoride.

As discussed above, the graphene oxide suitable to use in the methods disclosed herein is not particularly limited, and can be obtained by a variety of methods. In some embodiments, the graphene oxide can be formed using a Hummers or modified Hummers process to oxidize graphite. For example, graphite can be treated using a mixture of sulfuric acid, sodium nitrate, and potassium permanganate to obtain the graphene oxide. Other methods of forming the graphene oxide can also be utilized. The graphene oxide can be granular. The granular form can have an average particle size of, for example, less than or equal to about 100 µm; less than or equal to about 10 µm; less than or equal to about 1 µm; less than or equal to about 500 nm; or less than or equal to about 100 nm. The graphene oxide can be comminuted into granular form using standard procedures, such as crushing, grinding, ball milling, and the like.

The amount of graphene oxide in the composition is not particularly limited. Without being bound to any particular theory, typically the amount of graphene oxide needed is proportional to the thickness of the desired metal oxide-graphene composite desired. In some embodiments, the composition can include an amount of graphene oxide sufficient to cover the surface of the substrate. For example, the graphene oxide can cover at least about 1%, at least about 5%, at least about 10%, at least about 20%, at least about 50%, at least about 75%, at least about 85%, at least about 90%, at least about 95%, at least about 99%, or more of the surface area of the substrate. In some embodiments, the grapheme oxide covers about 10% to about 100% of the substrate. In some embodiments, the grapheme oxide covers at least about 5% of the substrate.

The metal powder can include elemental metal. In some embodiments, the metal powder can include one or more of zinc powder, iron powder, cobalt powder, nickel powder, manganese powder, tin powder, titanium powder, and copper powder.

In some embodiments, the metal powder can be granular. The granular form can have an average particle size of, for example, less than or equal to about 100 µm; less than or equal to about 10 µm; less than or equal to about 1 µm; less than or equal to about 500 nm; or less than or equal to about 100 nm. The metal powder can be comminuted into granular form using standard procedures, such as crushing, grinding, ball milling, and the like.

The amount of metal powder in the composition is not particularly limited. In some embodiments, the amount of metal powder in the composition is sufficient to cover the surface of the inert substrate.

The relative amount of metal powder to graphene oxide can also be varied, for example, to adjust the composition of the resulting metal oxide-graphene composite. The relative amount of metal powder to graphene oxide by weight can be, for example, at least about 0.1:10; at least about 1:10; at least about 1:5; at least about 1:3; at least about 1:1; or at least about 3:1. The relative amount of metal powder to graphene oxide by weight can be, for example, less than or equal to about 10:1; less than or equal to about 5:1; less than or equal to about 3:1; less than or equal to about 1:1; or less or equal to about 1:3. In some embodiments, the relative amount of metal powder to graphene oxide by weight is about 0.1:10 to about 10:0.1, or about 1:3 to about 3:1.

Returning to method 400, operation 420, "Heating the composition," the composition can be heated at a temperature that is effective to form the composite. In some embodiments, the composition is heated under an inert atmosphere, such as nitrogen or argon atmosphere. The composition can be heated at a temperature of, for example, at least about 20° C., at least about 30° C., at least about 50° C.; at least about 100° C., at least about 150° C., at least about 200° C., at least about 300° C., at least about 400° C., at least about 500° C., at least about 600° C., or at least about 700° C. The composition can be heated at a temperature of, for example, less than or equal to about 700° C., less than or equal to about 500° C., less than or equal to about 400° C., less than or equal to about 300° C., or less than or equal to about 200° C. In some embodiments, the composition can be heated under an inert atmosphere at a temperature of about 100° C. to about 700° C., or about 200° C. to about 600° C.

The composition can also be heated for a time period that is effective to form the composite. The composition can be heated for a time period of, for example, at least about 30 minutes; at least about 1 hour; at least about 4 hours; at least about 12 hours; or at least about 24 hours. The composition can be heated for a time period of, for example, less than or equal to about 100 hours; less than or equal to about 48 hours; less than or equal to about 24 hours; or less than or equal to about 12 hours. In some embodiments, the composition can be heated for a time period of about 30 minutes to about 100 hours, or about 3 hours to about 24 hours.

At operation 430, "Cooling the composition," the composition can be cooled at a temperature that is effective to form the composite. In some embodiments, the heat source used at operation 420 can no longer be applied to the composition, thereby allowing the composition to cool on its own. In some embodiments, a cooling source can be applied to the composition.

Method 400, in some embodiments, can also include isolating the metal oxide-graphene composite from the liquid medium. The present application is not limited to any particular technique for isolating the composite. Non-limiting examples of suitable techniques include filtration, centrifugation, and sedimentation. Two or more isolation techniques can be optionally combined. Generally, a solid form of the composite can be isolated. In some embodiments, the isolated composite can be washed to remove other materials and loose particles.

Some embodiments disclosed herein include a composition for making a metal oxide-graphene composite in situ. The composition can, in some embodiments, be obtained by any of the processes disclosed in the present application. For example, the composite can include at least one substrate and graphene oxide. In some embodiments, the at least one substrate is a metal-containing substrate. In some embodiments, the at least one substrate is an inert substrate. In some embodiments, the graphene can have a metal oxide covering the surface of the graphene.

Some embodiments disclosed herein include a metal oxide-graphene composite. The composite can, in some embodiments, be obtained by any of the processes disclosed in the present application. For example, the composite can include graphene wrapping the metal oxide. In some embodiments, the graphene can have a metal oxide covering the surface of the graphene. The light transmittance of the metal oxide-graphene composite can vary. In some embodiments, the metal oxide-graphene composite can be transparent. In some embodiments, metal oxide-graphene composite can have translucence. In some embodiments, metal oxide-graphene composite can be partially or substantially opaque.

The metal oxide-graphene composite obtained by the methods disclosed herein can be in various forms, such as films or particles. The thickness of a film of metal oxide-graphene composite can also vary. For example, the film of metal oxide-graphene composite can have a thickness of at least about 0.1 nm, about 1 nm, about 10 nm, about 50 nm, about 100 nm, about 1 µm, about 10 µm, about 50 µm, about 100 µm, about 500 µm, about 1 mm, or a range between any two of these values. In some embodiments, the film of metal oxide-graphene composite have a thickness of about 0.1 nm to about 1 mm, about 0.5 nm to about 500 µm, about 1 nm to about 250 µm, 5 nm to about 200 µm, or about 10 nm to about 100 µm.

Some embodiments disclosed herein include metal oxide-graphene composites for their use as functional thin films. For examples, the metal oxide-graphene composites can be used in varying types of devices, including but not limited to, electrochemical sensors, chemical sensor, supercapacitor, lithium ion batteries, photocatalysts, and light emitting diodes.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

One skilled in the art will appreciate that, for this and other processes and methods disclosed herein, the functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

EXAMPLES

Additional embodiments are disclosed in further detail in the following examples, which are not in any way intended to limit the scope of the claims.

Example 1: Preparation of $Ni(OH)_2$-Graphene Composite and Supercapacitor 6 ml of graphene oxide (5 mg/ml) was added into 44 ml of deionized water. After the solution was transferred to the inner tank of an autoclave having a volume of 100 ml, two pieces of nickel foam mesh (1×3 cm) were cut and flatly placed in the bottom of the inner tank for treatment at a constant temperature of 180° C. for 4-24 hours. After cooling, the nickel foam mesh was removed and washed clean to get a corresponding $Ni(OH)_2$-graphene composite, which was inspected by scanning electron microscopy (SEM). FIG. 7 shows one SEM image obtained from the sample.

Figure 8A:
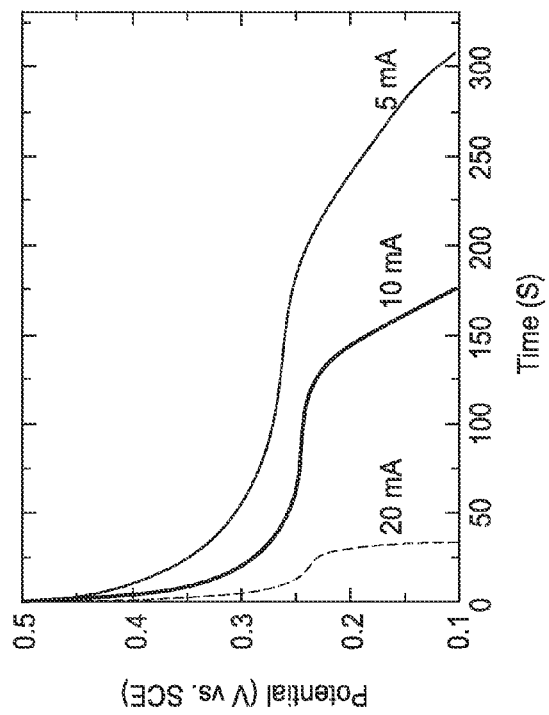
FIG. 8 shows a comparison of supercapacitor performance of $Ni(OH)_2$-graphene composite prepared according to Example 1 and untreated nickel foam mesh.
Figure 8B:
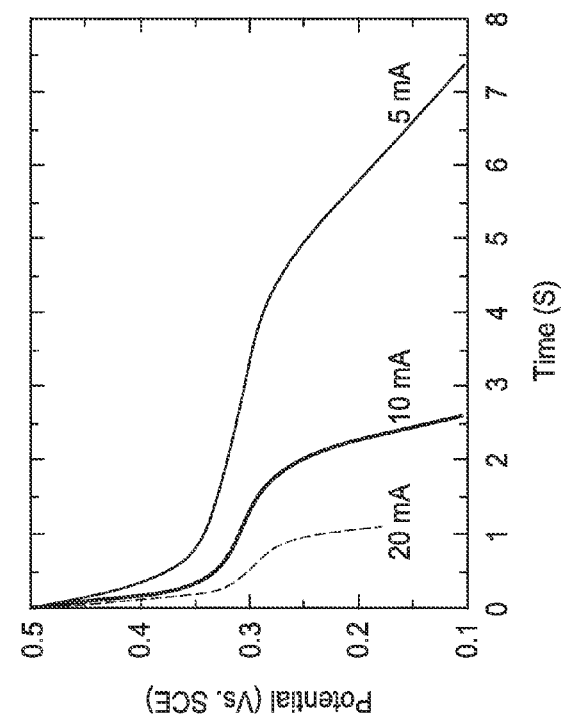

The supercapacitor performance of the $Ni(OH)_2$-graphene composite was measured in a 1 M K(OH) aqueous solution. An SCE was used as a reference electrode and Pt foil as a counter electrode. The surface area of the working electrode immersed in the electrolyte is about 1 cm by 1 cm. The results are shown in FIG. 8A, which shows the discharge curve of the untreated nickel foam mesh, and 8B, which shows the discharge curve of $Ni(OH)_2$-graphene composite. The comparison shows the favorable capacitance properties of the $Ni(OH)_2$-graphene composite.

In summary, this example demonstrates an efficient, one-pot reaction for forming a $Ni(OH)_2$-graphene composite with favorable capacitance properties. The process also does not require environmentally hazardous materials.

Figure 9:
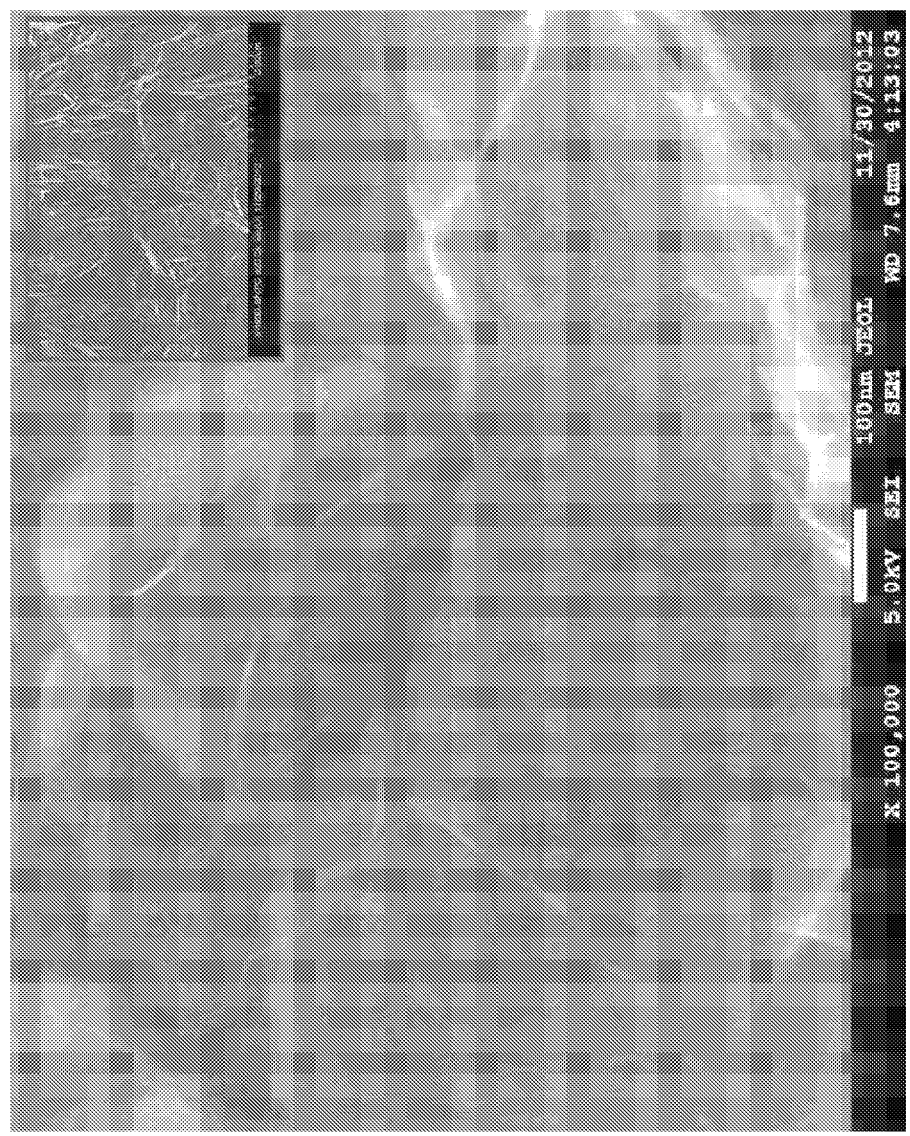
FIG. 9 shows a scanning electron microscopy image of a $Cu_2O$-graphene composite prepared according to Example 2.

Example 2: Preparation of $Cu_2O$-Graphene Composite 6 ml of graphene oxide (5 mg/ml) was added into 44 ml of deionized water. After the solution was transferred to the inner tank of an autoclave having a volume of 100 ml, two pieces of copper sheet (1×3 cm) were cut and flatly placed in the bottom of the inner tank for treatment at a constant temperature of 200-220° C. for 4-24 hours. After cooling, the copper sheets were removed and washed clean to get a corresponding $Cu_2O$-graphene composite, which was inspected by scanning electron microscopy (SEM). FIG. 9 shows one SEM image obtained from the sample.

Figure 10:
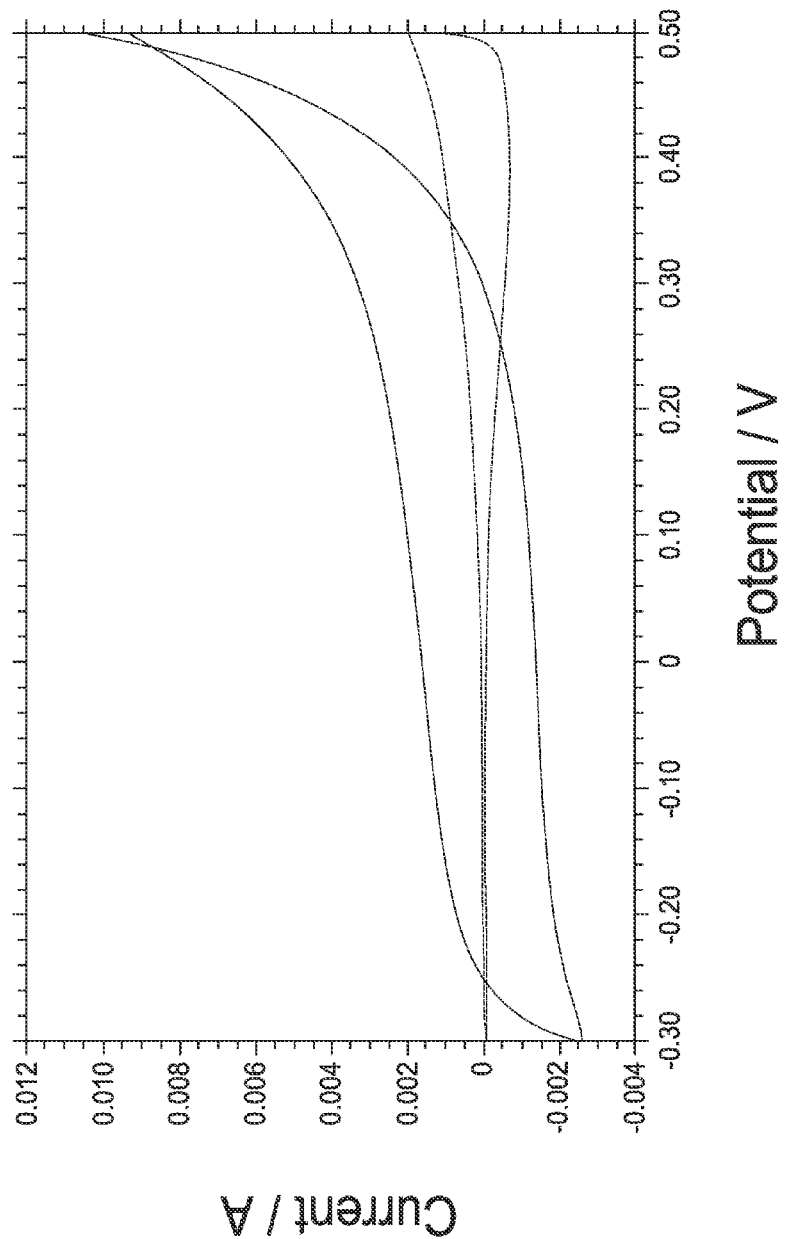
FIG. 10 shows the current-potential profile (or cyclic voltammogram) of a $Cu_2O$-graphene composite prepared according to Example 2 and the current-potential profile (or cyclic voltammogram) of an untreated copper sheet.

FIG. 10 shows the current-potential profile (or cyclic voltammogram) of a $Cu_2O$-graphene composite prepared according to Example 2 (shown as the solid lines) and the current-potential profile (or cyclic voltammogram) of an untreated copper sheet (shown as dashed lines). The current-potential profile was obtained in a 1 M K(OH) aqueous solution. An SCE is used as reference electrode and Pt foil is used as counter electrode. In addition, the surface area of the working electrode immersed in the electrolyte is about 1 cm by 1 cm.

Figure 5:
FIG. 5 shows a digital photograph of ZnO-graphene composites prepared according to Example 3.
Figure 5:
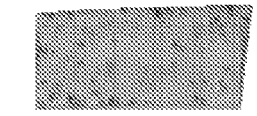
Figure 5:
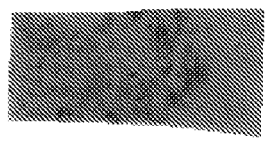

Example 3: Preparation of ZnO-Graphene Thin Films 1.2 ml of graphene oxide solution (5 mg/ml) added to 8.8 ml of deionized water, and then 1.28 mg of zinc powder was added to the mixture. The mixture was then stirred for 10 seconds. Another two solutions were prepared according to the same method. Stainless steel mesh, gold-plating thin film, and glass were added to the three solutions, respectively. After standing for 24 hours at room temperature, ZnO-graphene thin films were obtained. Digital photographs of ZnO-graphene thin films on the gold-plated thin film, glass, and stainless steel mesh are shown in FIG. 5 from right to left respectively.

Figure 6:
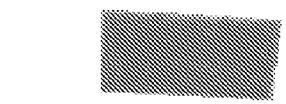
FIG. 6 shows a digital photograph of $Fe_2O_3$-graphene composites prepared according to Example 4.
Figure 6:
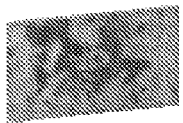
Figure 6:
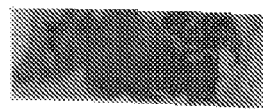

Example 4: Preparation of $Fe_2O_3$-Graphene Thin Films 1.2 ml of graphene oxide solution (5 mg/ml) was added to 8.8 ml of deionized water, and then 1.12 mg of iron powder was added to the mixture. The mixture was then stirred for 10 seconds. Another two solutions were prepared according to the same method. Stainless steel mesh, gold-plating thin film, and glass were added into above three solutions, respectively. After standing for 24 hours at room temperature, $Fe_2O_3$-graphene thin films were obtained. Digital photographs of these $Fe_2O_3$-graphene thin films on the gold-plated thin film, glass, and stainless steel mesh are shown in FIG. 6 from right to left, respectively.

Example 5: Preparation of ZnO-Graphene Oxide Composite Films

Zinc sheet (1×2 cm) was cut and flatly placed in a porcelain boat. Then, a layer of GO powder, carefully ground, was scattered over the surface of the zinc sheet. After treatment under inert atmosphere (nitrogen or argon atmosphere) at 200-600° C. for 3-24 hours and then cooling, the loose particles remained on the surface were blown off with nitrogen, thereby obtaining a ZnO-graphene oxide composite film.

Example 6: Preparation of $Mn_3O_4$-Graphene Oxide Composite Films

A layer of manganese was deposited by a sputtering process on the surface of gold sheet and then placed in the inner tank of an autoclave. Then, GO aqueous solution (0.6 mg/ml) was added. After hydrothermal treatment at 150° C. for 4-24 hours, a $Mn_3O_4$-graphene oxide composite film was obtained.

Example 7: Preparation of $Co_2O_4$-Graphene Composites 6 ml of graphene oxide (5 mg/ml) was added into 44 ml of deionized water, and then 58.93 mg of cobalt powder was added to the mixture. The mixture was stirred for 1 minute.

Figure 11:
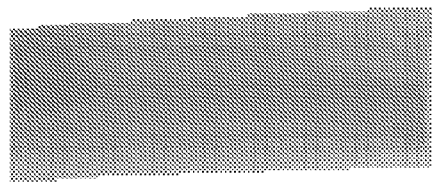
FIG. 11 shows a digital photograph of $Co_3O_4$-graphene composites prepared according to Example 7 and a digital photograph of untreated stainless steel mesh.
Figure 11:
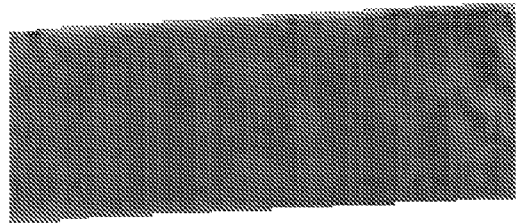

After the solution was transferred to the inner tank of an autoclave having a volume of 100 ml, two pieces of stainless steel mesh (1×3 cm) were cut and flatly placed in the bottom of the inner tank for treatment at a constant temperature of 200-220° C. for 4-24 hours. After cooling, the copper sheets were removed and washed clean, thereby obtaining a corresponding $Co_2O_4$-graphene composite. Digital photographs of $Co_2O_4$-graphene composite (shown on the right) and the untreated stainless steel mesh (shown on the left) are depicted in FIG. 11 $Co_2O_4$-graphene.

What is claimed is:

1. A method to make a metal oxide-graphene composite, the method comprising:
providing a composition that comprises graphene oxide and at least one metal-containing substrate, wherein size of the at least one metal-containing substrate is about 0.1 $mm^2$ to about 500000 $mm^2$, wherein the composition is dispersed in a liquid medium, and wherein the at least one metal-containing substrate comprises an inert material and an active substance, wherein the inert material comprises one or more of glass, ceramic, stainless steel, Au, Ag, Pt, Si, quartz, polytetrafluoroethylene, polyvinyl chloride, polyurethane, polycarbonate, poly(ethylene terephthalate), polyethylene, polypropylene, polystyrene, polymethyl methacrylate, and polyvinylidene fluoride, and wherein the active substance comprises one or more of Fe, Zn, Mn, Ni, Cu, Co, Ti, and Sn; and
forming the metal oxide-graphene composite, wherein forming the metal oxide-graphene composite comprises a redox reaction between the at least one metal containing substrate and the graphene oxide.

2. The method of claim 1, wherein the active substance forms a layer that has a thickness of at least about 1 nm.

3. A method to make a metal oxide-graphene composite, the method comprising:
providing a composition that comprises graphene oxide and at least one inert substrate, wherein size of the at least one inert substrate is about 0.1 $mm^2$ to about 500000 $mm^2$, and wherein the at least one inert substrate comprises one or more of glass, ceramic, stainless steel, Au, Ag, Pt, Si, quartz, polytetrafluoroethylene, polyvinyl chloride, polyurethane, polycarbonate, poly(ethylene terephthalate), polyethylene, polypropylene, polystyrene, polymethyl methacrylate, and polyvinylidene fluoride;
dispersing the composition in a liquid medium to form a mixture, wherein the mixture comprises a metal powder; and
forming the metal oxide-graphene composite, wherein forming the metal oxide-graphene composite comprises a redox reaction between the metal powder and the graphene oxide.

4. The method of claim 3, wherein dispersing the composition in the liquid medium comprises adding the metal powder into the liquid medium to form the mixture that comprises the metal-powder.

5. The method of claim 3, wherein the metal powder comprises one or more of zinc powder, iron powder, cobalt powder, nickel powder, manganese powder, tin powder, titanium powder, and copper powder.

6. The method of claim 3, further comprising isolating the metal oxide-graphene composite from the liquid medium.

7. The method of claim 3, wherein forming the metal oxide-graphene composite further comprises heating the mixture.

8. The method of claim 7, wherein heating the mixture comprises heating the mixture in a sealed chamber at a temperature above a nominal boiling point of the liquid medium.

9. The method of claim 3, wherein forming the metal oxide-graphene composite is performed at a temperature of about room temperature to about 240° C.

10. The method of claim 7, wherein forming the metal oxide-graphene composite further comprises cooling the mixture.

11. The method of claim 3, wherein the liquid medium comprises water, an organic solvent, or both.

12. The method of claim 11, wherein the liquid medium comprises one or more of dimethylformamide, $C_{1-8}$ alkanol, N-methyl pyrrolidone, N, N-dimethylacetamide, and dimethyl sulfoxide.

13. A method to make a metal oxide-graphene composite, the method comprising:
providing a composition that comprises graphene oxide and at least one metal-containing substrate, wherein size of the at least one metal-containing substrate is about 0.1 $mm^2$ to about 500000 $mm^2$, and wherein the at least one metal-containing substrate comprises an active substance and an inert material, wherein the active substance comprises one or more of Fe, Zn, Mn, Ni, Cu, Co, Ti, and Sn, and wherein the inert material comprises at least one or more of glass, ceramic, stainless steel, Au, Ag, Pt, Si, quartz, polytetrafluoroethylene, polyvinyl chloride, polyurethane, polycarbonate, polyethylene terephthalate, polyethylene, polypropylene, polystyrene, polymethyl methacrylate, and polyvinylidene fluoride; and
heating the composition to form the metal oxide-graphene composite, wherein heating the composition to form the metal oxide-graphene composite comprises a redox reaction between the metal containing substrate and the graphene oxide.

14. The method of claim 13, wherein the active substance forms a layer having a thickness of at least about 1 nm.

15. The method of claim 13, further comprises isolating the metal oxide-graphene composite.

16. The method of claim 15, wherein the metal oxide-graphene composite is a film.

17. The method of claim 16, wherein the metal oxide-graphene film has a thickness of at least about 1 nm.

18. A method to make a metal oxide-graphene composite, the method comprising:
providing a composition, dispersed in a liquid medium, that comprises graphene oxide, at least one inert substrate, and a metal powder, wherein size of the at least one inert substrate is about 0.1 $mm^2$ to about 500000 $mm^2$, and wherein the at least one inert substrate comprises one or more of glass, ceramic, stainless steel, Au, Ag, Pt, Si, quartz, polytetrafluoroethylene, polyvinyl chloride, polyurethane, polycarbonate, poly(ethylene terephthalate), polyethylene, polypropylene, polystyrene, polymethyl methacrylate, and polyvinylidene fluoride; and
heating the composition to form the metal oxide-graphene composite, wherein heating the composition to form the metal oxide-graphene composite comprises a redox reaction between the metal powder and the graphene oxide.

19. The method of claim 18, wherein the metal powder comprises one or more of zinc powder, iron powder, cobalt powder, nickel powder, manganese powder, tin powder, titanium powder, and copper powder.

* * * * *